United States Patent
Le Louedec et al.

(10) Patent No.: US 11,384,998 B2
(45) Date of Patent: Jul. 12, 2022

(54) PIPE SUPPORTING SYSTEM

(71) Applicant: SAFRAN AIRCRAFT ENGINES, Paris (FR)

(72) Inventors: Dominique Le Louedec, Saint Marcel (FR); Arnaud Sternchuss, Saint Germain en Laye (FR); Nicolas Ravier, Vernon (FR); Frederick Millon, La Croix St. Leufroy (FR); Bruno Bucher, Pont de l'Arche (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/123,411

(22) PCT Filed: Mar. 3, 2015

(86) PCT No.: PCT/FR2015/050510
§ 371 (c)(1),
(2) Date: Sep. 2, 2016

(87) PCT Pub. No.: WO2015/132522
PCT Pub. Date: Sep. 11, 2015

(65) Prior Publication Data
US 2017/0059258 A1    Mar. 2, 2017

(30) Foreign Application Priority Data

Mar. 5, 2014   (FR) ........................................ 1451789

(51) Int. Cl.
*F28F 9/00* (2006.01)
*F28F 9/013* (2006.01)
(Continued)

(52) U.S. Cl.
CPC ............ *F28F 9/0135* (2013.01); *B23P 15/26* (2013.01); *F16L 3/2235* (2013.01); *F28D 7/024* (2013.01);
(Continued)

(58) Field of Classification Search
CPC ........ F28F 9/013; F28F 9/0132; F28F 9/0135; F28F 9/007; F25B 39/04; F16L 3/223; F16L 3/2235
(Continued)

(56) References Cited

U.S. PATENT DOCUMENTS 4,231,421 A * 11/1980 Eaton .................... F28F 9/0132
165/125
4,323,043 A    4/1982 Alderson
(Continued)

FOREIGN PATENT DOCUMENTS

EP    0351247 A2   1/1990
GB    2463482 A    3/2010
(Continued)

OTHER PUBLICATIONS

International Search Report in corresponding International Application No. PCT/FR2015/050510 dated Jun. 9, 2015 (8 pages—English translation included).
(Continued)

*Primary Examiner* — Harry E Arant
(74) *Attorney, Agent, or Firm* — Bookoff McAndrews, PLLC

(57) ABSTRACT

A holding system (101, 102, 103) for holding at least one pipe, comprising a comb including a bar and parallel teeth perpendicular to the bar. A blocking device (30) consisting essentially of a pin, serves to prevent a pipe passing between two of the teeth from moving away from the bar.
(Continued)

The holding system further comprises two supports (40A, 40B), positioned at the ends of the comb, and which hold the comb so as to allow rotation thereof around the axis of the bar.

A method for mounting a heat exchanger (100) comprising such a holding system.

16 Claims, 4 Drawing Sheets

(51) Int. Cl.
    *F16L 3/223*     (2006.01)
    *F28D 7/02*     (2006.01)
    *B23P 15/26*     (2006.01)
    *F28D 21/00*     (2006.01)

(52) U.S. Cl.
    CPC .... *F28F 9/0132* (2013.01); *F28D 2021/0021* (2013.01)

(58) Field of Classification Search
    USPC .................................................. 165/67, 162
    See application file for complete search history.

(56) References Cited

U.S. PATENT DOCUMENTS

| | | | | |
|---|---|---|---|---|
| 4,380,263 A | * | 4/1983 | Wright | F28F 9/26 165/125 |
| 4,550,690 A | * | 11/1985 | Baugher | F22B 37/204 122/510 |
| 4,621,682 A | * | 11/1986 | Jennings et al. | F28F 9/0132 165/172 |
| 4,637,455 A | * | 1/1987 | Tordonato | F28F 9/0132 122/510 |
| 5,136,985 A | * | 8/1992 | Krowech | F22B 37/202 122/510 |
| 5,516,063 A | * | 5/1996 | Buckshaw | F16L 3/2235 211/60.1 |
| 7,367,380 B2 | * | 5/2008 | Lee | F25B 39/04 165/125 |
| 2009/0020273 A1 | * | 1/2009 | Schneider | F28D 7/06 165/162 |

FOREIGN PATENT DOCUMENTS

| | | | |
|---|---|---|---|
| JP | 5297462 | | 8/1977 |
| JP | S53157970 U | | 12/1978 |
| JP | S5421868 U | * | 2/1979 |
| JP | S6081485 U | | 6/1985 |
| JP | S61198876 U | | 12/1986 |
| JP | 06-074683 | * | 3/1994 |
| JP | H0674683 A | | 3/1994 |
| JP | H08121981 A | | 5/1996 |
| JP | 2017505885 A | | 2/2017 |
| WO | WO 97/37164 A1 | | 10/1997 |

OTHER PUBLICATIONS

Translation of Notice of Rejection (Official Action) for corresponding Japanese Application No. 2016-555477, dated Nov. 20, 2018 (5 pages).

* cited by examiner

PIPE SUPPORTING SYSTEM

CROSS-REFERENCE TO RELATED APPLICATIONS

This application is the U.S. national phase entry under 35 U.S.C. § 371 of International Application No. PCT/FR2015/050510, filed on Mar. 5, 2015, which claims priority to French Patent Application No. 1451789, filed on Mar. 5, 2014.

The invention relates to a holding system for holding at least one pipe and, in particular, a pipe subjected to forces tending to cause its displacement with respect to the structure to which it is attached. Such forces may be caused in particular by acceleration of this structure, and/or by thermal expansions or contractions which the pipe and/or the structure undergo (undergoes) and by turbulence in gas flow.

In this document, the present invention will be described essentially by referring to one (single) pipe; it must be well understood, however, that the invention is also applicable in a holding system serving to hold several pipes distinct from one another.

One important application of the invention relates to a heat exchanger for rocket engine. This exchanger consists principally of a pipe called a coil, coiled so as to form helical turns, attached inside a cylindrical tube (of circular section), the diameter whereof is only slightly larger than that of the turns of the coil.

This heat exchanger, called a heater, is used to heat the hydrogen used as a fuel by the rocket engine by drawing heat from the exhaust gases of the rocket engine. Thus, the liquid hydrogen is injected into the coil at a temperature of approximately 40K; it leaves the coil at a temperature of approximately 400K. The hydrogen is heated by the exhaust gases circulating in the cylindrical tube, which have a temperature near 700K.

It is understood that the coil tends to undergo considerably differential thermal expansions due to the very high differences in temperature to which it is subjected. These differences in temperature tend to cause deformations of the coil, allowed in particular by the small thickness thereof (only 1 mm, for a coil diameter near 250 mm).

The system for holding the coil must be capable of limiting to acceptable values the displacements of the coil due to these thermal expansions and contractions.

On the other hand, being carried on board a rocket, the coil is subjected to very strong vibrations and accelerations, as well as to the turbulence of the gases. It must therefore also be held in the radial and axial directions so as to resist these stresses.

Conversely, mechanical holding of the coil, which is indispensable for the foregoing reasons, must be provided while still maintaining a level of mechanical stresses as low as possible in the coil. In fact, such stresses are likely to cause deteriorations in the coil, and in particular a deterioration of the welds formed at the ends of the coil by its connection to the upstream and downstream portions of the hydrogen distribution circuit of the rocket engine, and thus to cause hydrogen leaks in the engine. Such leaks are naturally unacceptable.

The objective of a first aspect of the invention is therefore to propose a holding system for holding at least one pipe, capable of holding this or these pipe(s) despite the stresses to which it is subjected or to which they are subjected, whether these stresses are related to thermal expansions or contractions, and/or due to vibrations or to accelerations undergone by the pipe(s), and/or by a structure to which the pipe(s) are attached, while maintaining a minimal level of mechanical stresses in the pipe(s), and at a moderate cost.

This goal is attained thanks to the fact that the holding system comprises a comb including a bar and a plurality of parallel teeth perpendicular to the bar, and a blocking device capable of preventing a pipe passing between two of said teeth to move away from the bar.

In the foregoing sentence, the pipe is assumed to have a cylindrical shape; thus, so that the blocking device is able to prevent a pipe passing between two teeth from moving away from the bar, it is enough that the passage formed between the two considered teeth be at least partially obstructed by said blocking device (placed in/and or facing said passage), the blocking device being moreover held at a fixed distance from the bar. The comb may have in particular, between the two considered teeth, a free passage which includes the volume of a pipe segment, with an axis generally perpendicular to the bar and to the teeth, and the blocking device includes a wall or an obstacle positioned in such a manner that this wall or this obstacle is necessarily encountered or struck by this pipe segment during a displacement of this segment between the considered comb teeth in the direction moving the segment away from the comb to remove it from the comb.

Advantageously, thanks to the invention, when one or more pipes are positioned in parallel so as to pass between the teeth of the comb, the blocking device holds this or these pipe(s) in position and consequently allows the holding system to definitely provide for the holding of this or these pipe(s).

Holding of one or more pipes by the blocking device is preferably accomplished in a relatively loose manner, to avoid applying useless stresses to the pipe(s). The holding system may in particular allow displacement of the pipes along the axial direction of the free passages between the teeth of the comb, i.e. in the axial direction of the pipe(s).

The pipe generally has the shape of a coil which is intended to be held in a tube. In this case, the relatively loose holding of the different turns of the coil in the tube by the blocking device allows expansion of the turns of the coil and consequently, possible rotation of one or more turns of the coil with respect to the tube.

In the holding system, the following arrangements are preferably adopted, alone or in combination:
  The blocking device may be supported on at least two teeth of the bar, and in particular on two end teeth located at the ends of the bar.
  The blocking device may be supported on at least one intermediate tooth remote from the ends of the bar.
  The blocking device may consist essentially of a pin. A pin designates here a part with an elongated shape, particularly a rod. The rod may possibly be hollow, and/or split.
  at least one tooth of the comb may have a hole, and the pin may be configured to (and capable of) pass into it.
  this pin may comprise a shell of a generally cylindrical shape split along an axis of the shell. This shape allows, in fact, radial elastic deformation of the pin.
  The blocking device may have at least one pipe support notch, particularly in a substantially cylindrical or toroidal shape.
  The pipe support notch may allow support of the same over an area along an axis of the pipe (or of the passage provided for the pipe) at least equal to a maximum diameter of passage in the pipe.

At least one passage in the comb between two adjacent teeth may have an inclination with respect to an axis of the bar.

At least one passage in the comb between two adjacent teeth may have a cylindrical or toroidal shape.

The system may further comprise two supports positioned at the ends of the comb. These supports may be configured to hold the comb so as to allow a rotation thereof around an axis of the bar.

these supports may possibly hold or contribute to holding the blocking device. The blocking device may thus be supported on at least one support, or possibly on both supports.

Each of the supports may be configured to be attached to a wall, for example the wall of a tube, to which the pipe(s) is/are to be attached.

The invention also allows obtaining an assembly including a plurality of holding systems attached to an interior wall of a cylindrical tube, positioned axisymmetrically about an axis of said tube. Such an assembly is adapted to maintain a pipe helically coiled in the tube, called a coil. Preferably, the holding systems are placed axially (along the axis of the tube) in regularly staggered positions, so as to support the turns of the coil while deforming it minimally.

The invention also relates to a heat exchanger including at least one holding system and/or an assembly as defined previously.

The invention relates, finally, more generally to a rocket engine, or also to an industrial production unit, including at least one system and/or an assembly and/or a heat exchanger as defined previously.

A second aspect of the invention relates to a method for mounting a heat exchanges consisting primarily of a coil including a plurality of turns, arranged inside a tube. In conformity with this second aspect of the invention, the heat exchanger is mounted thanks to the following operations:

a) there are provided:
 the tube, the coil and a pin;
 a comb including a bar and a plurality of parallel teeth, perpendicular to the bar; and
 two supports, capable of being positioned at the ends of the comb and to hold the comb so as to allow a rotation thereof around an axis of the bar;
b) a first of the two supports is positioned and attached to the inner wall of the tube;
c) the comb is positioned in the tube by holding the comb in such a manner that it is folded against said wall;
d) the coil is put in place (i.e., inside the tube and generally positioned coaxially with respect to the tube);
e) after steps b) and c), the comb is pivoted so that its teeth are radially oriented in the tube and axially block turns of the coil (at least one turn, possibly all the turns);
g) the second of the supports is positioned and is attached to the inner wall of the tube; and
h) the pin is attached to the comb and/or to the supports so as to constitute a blocking device (30) preventing all the turns or a portion of the turns passing between said teeth to move away from the bar.

In the method defined above, steps c) and d) may be carried out in any order (step c) before step d) or step d) before step c)).

In fact, as long as the comb is positioned in a position folded against the wall (meaning that the axis of the teeth is locally substantially parallel to the wall), the comb and the coil may be placed or displaced in the tube independently of one another.

In one embodiment, the pin provided in step a) is chosen to be capable of passing through at least one hole in a tooth of the comb.

In this case, the method may in particular comprise a step f) prior to step g), during which the pin is put in place by having it pass into said at least one hole in a tooth of the comb.

In one embodiment, steps g) and h) are accomplished simultaneously or substantially simultaneously by positioning the second support on the inner wall of the tube and by attaching the pin to this at least so as to block the pin and thus constitute the blocking device.

In one alternative embodiment, the method is implemented by using an elastic pin (at least in its longitudinal direction).

Step h) is then accomplished after step g) in the following manner:
 the pin is compressed in its longitudinal direction;
 it is placed or put in position between the supports; then
 it is released or slackened in such a manner that it is blocked between the supports.

In step g), after having attached the second support, or after having slackened the pin in the above case, all the degrees of freedom of the pin are generally blocked, with the exception of rotation of the pin around its longitudinal axis, which may remain possible.

After this blocking of the pin, those of the turns of the coil which are positioned between the teeth of the comb are blocked by the pin and prevented from moving away from the bar of the comb. As was indicated earlier, these spires generally retain, however, the possibility of moving with respect to the wall of the tube (and the comb) in their circumferential direction.

The invention will be well understood and its advantages will appear more clearly upon reading the detailed description that follows, of embodiments shown by way of non-limiting examples. The description refers to the appended drawings, on which:

Figure 1:
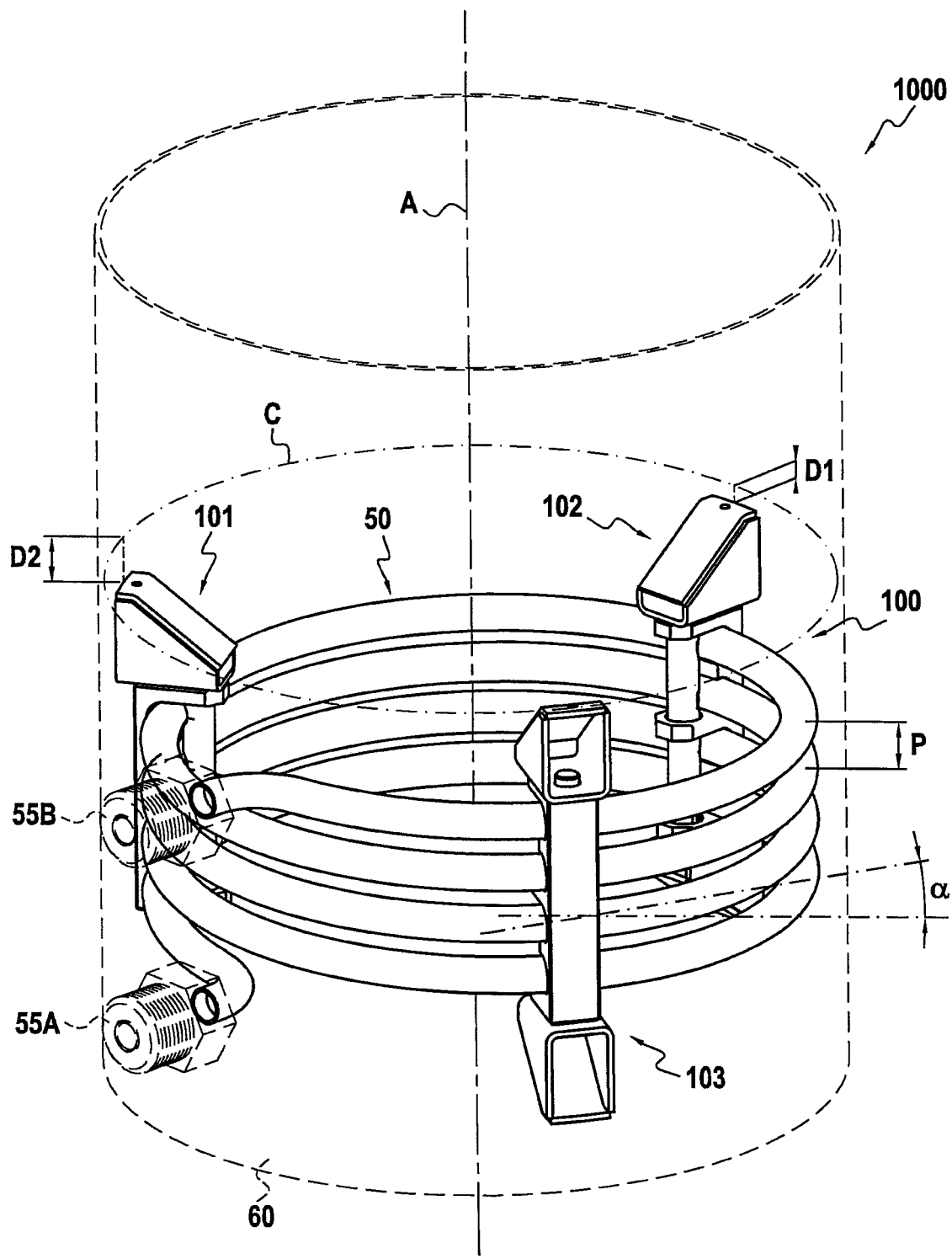
FIG. 1 is a schematic view in perspective of a heater for a rocket engine, comprising three holding systems according to the invention.

As may be seen in FIG. 1, a heater 100 comprises a coil 50, a cylindrical tube 60 and three identical holding systems 101, 102, 103 used to attach the coil 50 in the tube 60.

The coil includes four substantially identical turns 51, 52, 53 and 54 (FIG. 3) offset two by two at a constant pitch P along the axis A of the tube 60. The ends of the coil pass through the wall of the tube 60 and are attached by means of connectors 55A, 55B, to upstream and downstream portions (not shown) of the hydrogen distribution circuit.

The heater 100 is part of a rocket engine 1000 of which only the heater is shown.

Alternatively, it is possible to consider that reference symbol 1000 designates an industrial unit, of which the heater 100 would be a part.

Hydrogen is injected at a temperature of approximately 40K into the coil, through the connector 55A, and leaves via the connector 55b of the coil at a temperature of approximately 400K.

Figure 2:
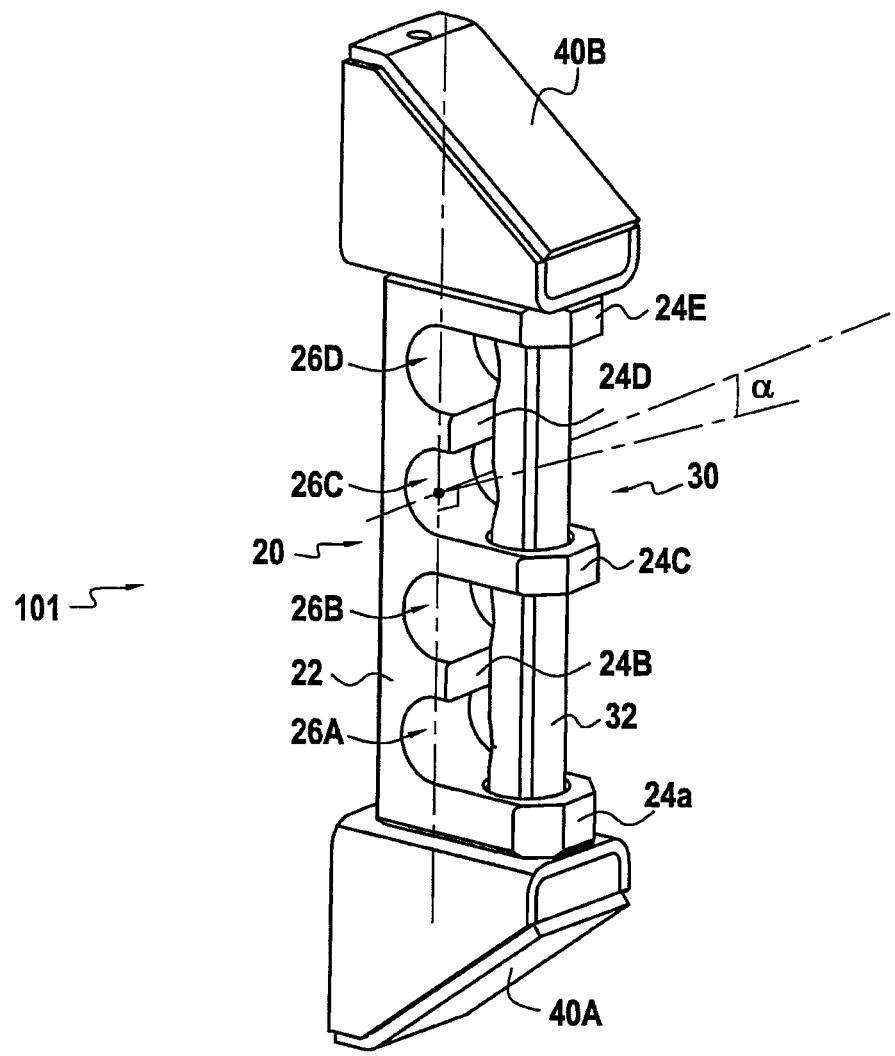
FIG. 2 is a schematic view in perspective of one of the holding systems shown in FIG. 1.

The holding systems 101, 102 and 103 are identical; thus, only the system 101 will now be described, with reference to FIG. 2.

The system 101 includes a comb 20 and a blocking device 30 consisting essentially of a pin 32.

The comb 20 includes a bar 22 and five parallel teeth 24A, 24B, 24C, 24D and 24E, perpendicular to the bar. The teeth 24A to 24E are designated collectively with the reference symbol 24.

Between the teeth, passages 26A, 26B, 26C and 26D are arranged, designated collectively as the passages 26.

When the coil 50 is in the holding position by the holding system 101, the different turns 51 to 54 pass respectively in the different passages 26A to 26D, each turn passing between two adjacent teeth.

Each of the turns 51-54 is prevented by the pin 32 from moving away from the bar 22 and shifting itself radially toward the interior, i.e. approaching the axis A. Each of the turns is moreover axially held by the walls of the passage through which it passes, which are surfaces of the different teeth 26A to 26E.

Figure 3:
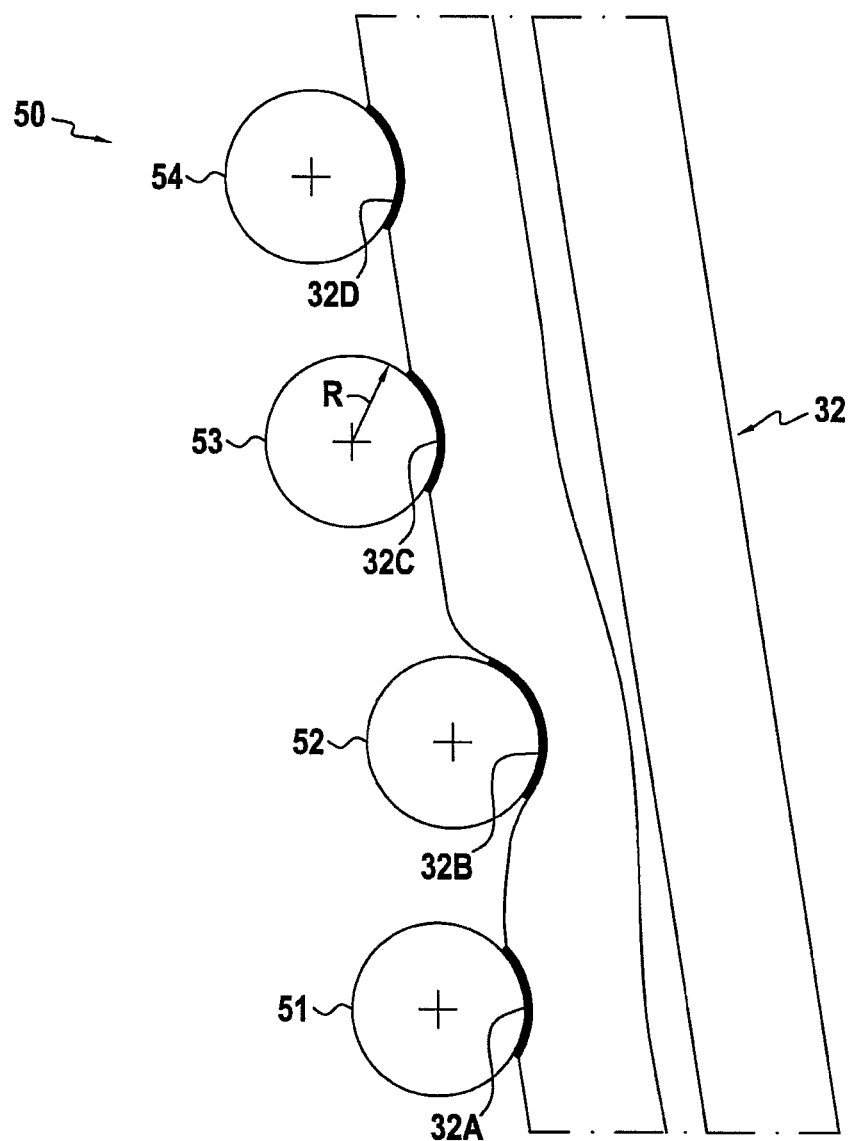
FIG. 3 is a partial schematic section, perpendicular to a holding system, of the heater of FIG. 1.
Figure 4:
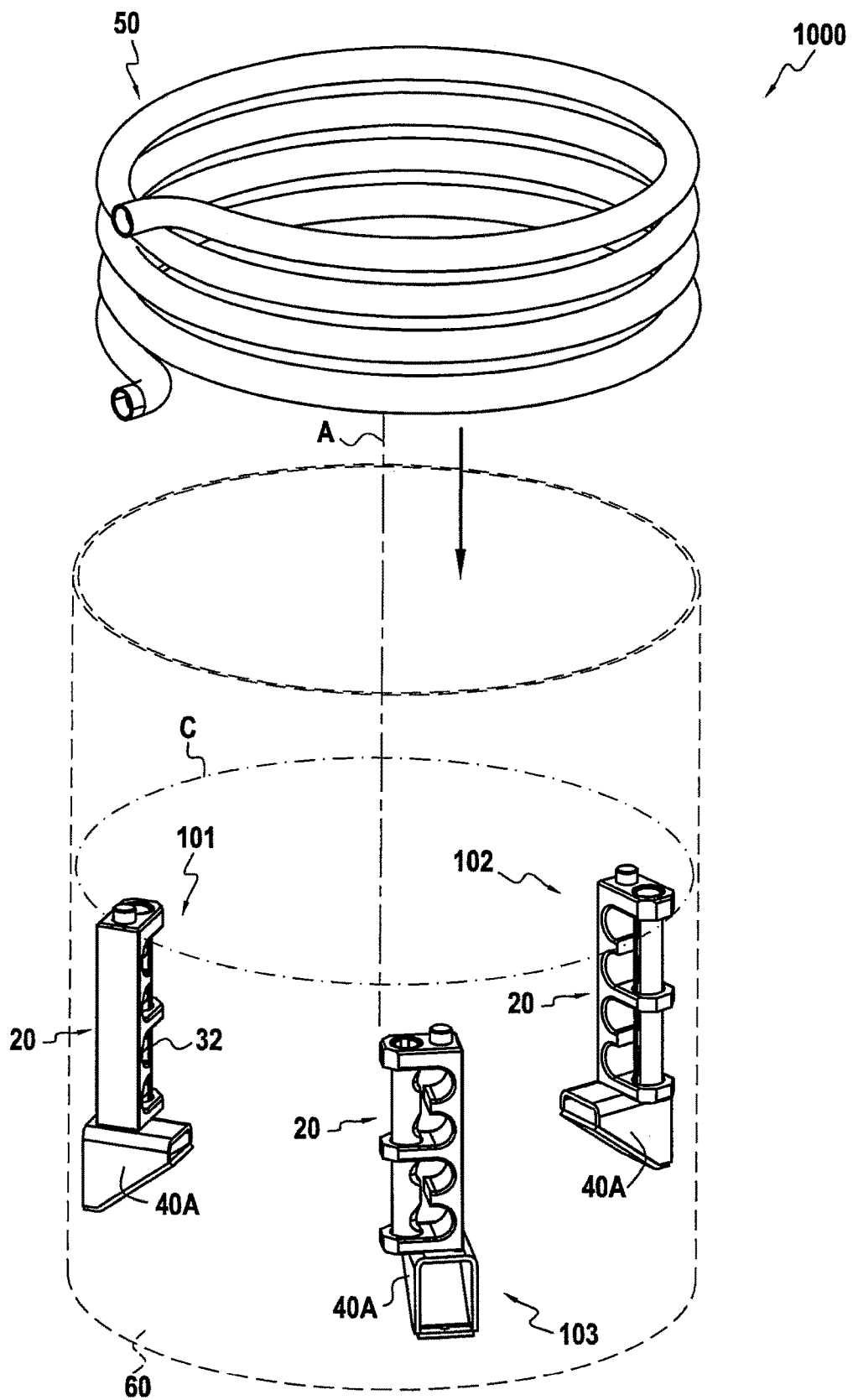
FIG. 4 is a schematic view in perspective of a mounting step of the heater shown in FIG. 1.

The passages 26 have a cylindrical shape, i.e. the shape of a portion of a cylinder (this form would possibly be toroidal), and more precisely the shape of a cylinder the radius whereof is equal to the radius R of the transverse section of the turns or very slightly greater (FIG. 3). Thus each turn may have distributed, rather than point-wise support, in the bottom of the passage 26 in which it is placed. The passage 26 provides for axial holding of the turn, and further limits radial movements of the turn in the direction tending to move it away from or toward the axis A.

Moreover, the axes of the cylindrical surfaces of the different passages 26 are not perpendicular to the axis A. These axes (called "axes of the passages") are in fact slightly inclined with respect to the axis of the bar 22, the inclination angle (angle α) being equal to that formed by the turns of the coil with respect to the axis A of the tube 60. It follows that when the combs 20 are mounted inside the tube 60, the axes of their bars 22 then being parallel to the axis A, the axes of the passages 26 are locally parallel to the axes of the turns of the coil, at the point where these turns are supported in the different passages 26.

Holding and attachment of the blocking device 30 (the pin 32) with respect to the comb 20 are provided by the teeth of the comb 20.

To this end, the teeth located at the ends of the bar 22 or end teeth (24A and 24E), as well as the median tooth 24C, are more elongated than the intermediate teeth 24B and 24D. In fact, the teeth 24A, 24C and 24E are elongated and each include a flattened end, in which is formed a through hole (one hole for each of these teeth), the three holes thus formed being aligned with an axis parallel with the axis of the bar 22 of the comb 20.

The diameter of these holes is selected so as to allow the passage and free rotation of the pin 32 in these holes. In passing through the three holes thus formed, the pin 32 is supported on the three teeth 24A, 24C and 24E, which blocks its displacements in the plane perpendicular to the axis of the bar 22, and thus allows it to carry out its function of preventing all movement of the turns tending to move them away from the bar 22.

The pin 32 has the general shape of a straight bar. However, the pin is in fact hollow, and consists of a shell with a generally tubular overall shape. This envelope is split along an axis of the shell over the entire length of the pin, this in such a manner that when the pin is unstressed, the edges of the slot are slightly separated from one another.

This shape allows the pin to compress elastically (and not plastically) when the turns press on the pin, as will be clarified later.

The pin further has four turn support notches 32A, 32B, 32C and 32D (FIG. 3). These notches are shaped substantially as portions of cylinders; they allow, when one of the turns is supported by the pin, providing an extended rather than point-wise support surface to the turn, which means that the stress level in the turn remains moderate and the appearance of a local stress peak is avoided.

The support surface extends, in the axis of the pipe, over an extent along the axis of the pipe at least equal to the diameter of the pipe.

The notches are spaced two by two by a pitch P, and placed on the same side of the pin 32.

The holding system 101 further includes two supports 40A and 40B, positioned at the ends of the comb 22. These supports are used to prevent any translation and any rotation of the comb 20, with the exception of its rotation around the axis of the bar 22, which remains allowed particularly to allow mounting of the system, as will now be described.

The supports 40A and 40B are also used to hold the pin 32 in the axial direction of the heater 100. To this end, the supports 40A and 40B are arranged with a wall perpendicular to the axis of the pin 32, which blocks it in translation and forces it to remain axially (with respect to the axis A of the bar) in the position in which the notches are axially at the same level as the turns 51 to 54 and as the different passages 26.

To mount the heater 100, the operations to be carried out are the following:

a) the cylindrical tube 60, the coil 50, and the necessary components for producing three holding systems are provided, to wit: three combs 20, three pins 32 and three pairs of supports 40A, 40B.

b) the three supports 40a are then positioned and attached to the inner wall of the tube (each support 40A is a lower support for the holding system of which it is a part).

d) the coil 50 is put in place.

c) the combs 20 are positioned while holding them in such a manner that they are folded against the wall. To this end, the combs are slid between the wall of the tube and the turns of the coil.

e) the combs 20 are pivoted so that their teeth are oriented radially in the tube 60 and axially block the turns 51-54 of the coil 50.

f) for each holding system, a pin 32 is placed by having it pass into the holes in the teeth 24A, 24C and 24E of the comb 20 (the pins 32 are compressed without plastic deformation);

g) the supports 40B are positioned (each support 40B is a second support or upper support for the holding system of which it is a part) and they are attached to the wall of the tube 60 so as to finish the blocking of the pins 32 and consequently of the turns of the coil 50.

More specifically, the mounting operations to be carried out are the following:

b) the three supports 40A are positioned and attached to the wall of the tube 60;

d) the coil 50 is put in place, c) the combs 20 are then positioned, holding them in such a manner that they are folded against the wall;

e) the combs 20 are then pivoted so that their teeth are radially oriented in the tube 60 and axially block the turns 51-54 of the coil 50;

f) the elastic pins 32 are placed, which are compressed without having them undergo plastic deformation, by having them pass into the holes in the teeth 24A, 24C and 24E (while making sure not to damage the coil 50);

g) the supports 40B are positioned and they are attached to the wall of the tube 60, which finishes blocking the pins 32 and consequently, the turns of the coil 50.

It will be noted that during step c), the combs 20 are positioned on the supports 40A in such a manner that the axes of the bars 22 are directed along the axis A, and the teeth of the comb are directed in a non-radial direction in the tube 60, which corresponds to the "folded" position of the comb 20. In this folded position of the comb 20, the teeth of the comb are preferably oriented in a circumferential, or at least substantially circumferential direction. In this position, the combs 20 are sufficiently thin to be able to pass around the turns 51-54, between the tube and the coil. Once the combs 20 are placed on the supports 40A, and are therefore axially (with respect to the axis A) in the desired position, in step e) they are pivoted around the axis of the bars 22, which brings the combs into the position shown in FIG. 1, with the teeth radially oriented in the tube 60.

Once operations a) and g) are carried out, the coil 50 is connected to the hydrogen distribution circuit through the wall of the tube 60 using the connectors 55A and 55B (FIG. 1).

Moreover, it will also be noted that the three holding systems 101, 102 and 103 are not axially positioned at the same level in the tube 60. They are in fact axially shifted two by two, so that the position of the holding system axially corresponds to the position of the turns that it must hold. Thus, with three holding systems angularly spaced by 120°, it is suitable to shift the systems two by two by a pitch equal to one third of the pitch P of the turns of the coil 50. This arrangement is illustrated in FIG. 3, in which is shown a circle C with axis A passing through the top of the system 101. Due to the inclination of the turns of the coil, the system 102 is shifted axially by a distance D1 equal to P/3, and the system 103 by a distance D2 equal to 2P/3.

During operation of the rocket engine 1000, the heater behaves in the following manner:

The hydrogen injected into the coil 50 via the connector 55A is at a temperature of approximately 40K. This hydrogen is heated by passing through the coil and as a result, tends to cool the wall of the coil.

It follows that the turn 51 contracts very slightly (not insignificantly, however) and that the turn 52 tends to contract rather quite considerably. Due to this contraction, the turn 52 presses on the pin 32, in the notch 32B. As the pin 32 is split, it locally deforms, elastically, to allow a slight radial displacement of the turn 52 toward the axis A.

The turns 53 and 54, on the other hand, have a tendency to dilate and increase in diameter (measured with respect to the axis A) because the temperature of the hydrogen contained in these turns is considerably greater than that of the hydrogen contained in the turns 51 and 52.

The pin 32 and the comb 20 are arranged in such a manner that, when the engine 1000 operates, all the turns preferably press on the pin 32, causing radial deformations thereof of a greater or lesser degree (FIG. 3).

These radial deformations are elastic deformations. This allows that, no matter the variations in temperature in the heater 100, the pins maintain an elastic support on the turns of the coil 50, thus avoiding the appearance of clearances, which are potential vibration generators.

As shown in FIG. 3, at the time the heater 100 is started up, the turns undergo slight radial deformations, which are contained by the holding systems 101, 102 and 103. These radial deformations may be accompanied by slight displacements of the turns along the circumferential direction of the tube 60. As the combs 20 are free to rotate around the axis of the bars 22, and the pins 32 are also free to rotate around their own axis, these displacements along the circumferential direction of the turns 51-54 may be to some degree accompanied by a rotation of the combs 20 and/or the pins 32 in question, which also contributes to limiting the stress level attained in the turns.

In addition, the slight inclination of the passages 26 (angle α), their cylindrical shape which takes on the shape of the turns 51, the notches arranged in the pins, allow the turns 51 to 54 to have distributed, and not point-wise, supports, on the holding systems 101 and 103.

These different features make it possible for the holding systems 101, 102, 103 to hold the coil 50 in position while limiting the level of mechanical stresses therein to a minimum level.

The embodiment presented comprises three holding systems and four turns. The invention is naturally applicable to any number of holding systems and turns of the coil. The holding systems are also usable in rectilinear tubes or others.

Moreover, a holding system conforming to the invention may be used in the space industry. It may also relate more broadly to all industries in which coil exchangers are used subjected to strong thermal stresses.

The invention claimed is:

1. An assembly comprising a cylindrical tube and at least one holding system for holding at least one coil, said at least one holding system comprising:
   a comb including a bar and a plurality of parallel teeth, perpendicular to the bar,
   a blocking device capable of preventing a turn of the coil passing between two of said teeth to move away from the bar,
   the blocking device consisting essentially of a pin, wherein the bar is between the blocking device and the cylindrical tube; and
   two supports positioned at the ends of the comb, and holding the comb in such a manner that, when the blocking device is removed, rotation of the comb around an axis of the bar is allowed, during which turns of the coil can pass between the teeth; wherein each of the supports is attached to an inner wall of the cylindrical tube for supporting the turns of the coil and remains attached to the inner wall during the rotation of the comb around the axis of the bar, and
   wherein the axis of the bar is parallel to an axis of the cylindrical tube.

2. The assembly according to claim 1, wherein the blocking device is supported on at least two teeth of the bar.

3. The assembly according to claim 1, wherein the pin comprises a shell of a generally cylindrical shape split along an axis of the shell.

4. The assembly according to claim 1, wherein the blocking device has at least one coil support notch.

5. The assembly according to claim 1, wherein at least one tooth of the comb has a hole, and the pin is configured to pass into the hole.

6. The assembly according to claim 1, wherein a plurality of passages is arranged in the comb, each passage being arranged between two adjacent teeth so that the coil can pass in the passage, and the axes of cylindrical surfaces of the passages are not perpendicular to an axis of the cylindrical tube.

7. The assembly according to claim 1, wherein at least one passage in the comb between two adjacent teeth has a cylindrical or toroidal shape.

8. The assembly according to claim 1, wherein the two supports hold the blocking device.

9. The assembly according to claim 1, wherein the axis of the bar, around which rotation of the comb is allowed when the blocking device is removed, is distinct from an axis of the pin.

10. The assembly according to claim 9, wherein the pin of the blocking device is configured to prevent the turn of the coil passing between two of said teeth to move away from the bar towards the axis of the cylindrical tube.

11. The assembly according to claim 1, wherein the pin of the blocking device is configured to prevent the turn of the coil passing between two of said teeth to move away from the bar towards the axis of the cylindrical tube.

12. The assembly according to claim 1, wherein the comb is configured to rotate around the axis of the bar between a folded position, in which the comb is folded against said wall, to an extended position, in which the teeth are oriented radially inwards towards a central axis of the tube.

13. A heat exchanger, including at least one assembly according to claim 1.

14. A rocket engine, including at least one heat exchanger according to claim 13.

15. An industrial production unit including at least one assembly according to claim 1.

16. A rocket engine, including at least one assembly according to claim 13.

* * * * *